United States Patent [19]

Seto et al.

[11] Patent Number: 5,402,580
[45] Date of Patent: Apr. 4, 1995

[54] CHUCK MECHANISM

[75] Inventors: Norio Seto; Takeshi Iizuka, both of Tokyo, Japan

[73] Assignee: Osada Research Institute, Ltd., Tokyo, Japan

[21] Appl. No.: 107,099

[22] Filed: Aug. 16, 1993

[30] Foreign Application Priority Data

Jun. 30, 1993 [JP] Japan .................. 5-160603

[51] Int. Cl.⁶ .................. B23B 29/04; B23B 31/16
[52] U.S. Cl. .................. 30/394; 30/392; 279/52; 279/59
[58] Field of Search .................. 30/392, 393, 394, 329; 279/52, 59

[56] References Cited

U.S. PATENT DOCUMENTS

| | | | |
|---|---|---|---|
| 2,087,018 | 7/1937 | Carter | 30/392 |
| 3,260,289 | 7/1966 | Whitten, Jr. | 30/392 |
| 3,927,893 | 12/1975 | Dillon et al. | 30/392 |
| 4,204,692 | 5/1980 | Hoffman | 30/394 |
| 4,864,727 | 9/1989 | Chu | 30/394 |

Primary Examiner—Richard K. Seidel
Assistant Examiner—Hwei-Siu Payer
Attorney, Agent, or Firm—Jordan and Hamburg

[57] ABSTRACT

A chuck mechanism is described, which is easy to handle with a chuck clamping handle of increased diameter and is capable of achieving smooth movement of its reciprocally movable portion of reduced weight and assures safe operation with the least exposure of outwardly moving portion. Rotating a knurled portion of a body case rotates an intermediate transmission member which in turn rotates a slide shaft stopping member to tighten or loosen its engagement with a slide shaft, causing clamping or releasing of a collet chuck. The slide shaft, slide shaft locking member, chuck and a saw can reciprocally move as a single unit.

5 Claims, 6 Drawing Sheets

CHUCK MECHANISM

BACKGROUND OF THE INVENTION

The present invention relates to a chuck mechanism and more particularly to a chuck mechanism for removably chucking a jig on a reciprocally-movable member.

In dental treatment, tooth cutting is carried out by using a cutting tool to be driven by a micromotor rotating at high speed. In recent years, with the progress of subdivision of medical areas and specialization of medical technology, there have appeared specialists being engaged, for example, in medical treatment of hands or feet only. In medical treatment of hands or feet, it is also necessary to carry out operations such as bone amputation or cutting, but no cutting device which is suitable for use in medical treatment of hands or feet, has been developed. Every specialist feels inconvenienced not having it.

In view of the foregoing, the present applicant previously proposed a cutting device which is suitable for amputating and/or cutting fine bones of hands and feet of human and animals. The proposed cutting device has a chuck mechanism for converting rotational movement of a shaft into linear reciprocal movement of a member reciprocally movable in an axial direction of the shaft and for removably chucking a jig to the reciprocally movable member to conduct various kinds of operations by use of the jig.

In the above-mentioned cutting device, the chuck clamping member has an increased diameter to be easily tightened or loosened when mounting or removing of a saw in or from the chuck. However, provided that the chuck clamping member has a small diameter, it is hard to handle the chuck to clamp or release when mounting or removing of the sawing plate in or from the chuck.

SUMMARY OF THE INVENTION

It is an object of the present invention to provide a chuck mechanism comprising a chuck clamping member having a grasping portion of a large diameter which is easy to handle when clamping or releasing a collet chuck and the reciprocating portion which has a reduced mass to ensure a smooth movement.

It is another object of the present invention to provide a chuck mechanism which is safe to use by its moving portion of a least partial exposure.

It is another object of the present invention to provide a chuck mechanism which has a small diameter not to hit a part of human body or animal's body or other object during the medical treatment.

It is another object of the present invention to provide a chuck mechanism which is useful for a cutting device used for amputating and/or cutting bones of humans and animals or other kinds of material, e.g., wood and so on.

It is another object of the present invention to provide a chuck mechanism comprising a slide shaft locking member having a head for clamping a collet chuck at one end and an internally threaded portion at the other end for attracting the head toward the collet chuck and a body case for turning the slide shaft locking member in its axial direction to clamp or release a chuck, the slide shaft locking member together with the chuck can reciprocate without moving the body case, whereby the mass of the reciprocally moving portion is reduced and a small part of the moving portion may be exposed outside the body case.

DESCRIPTION OF THE INVENTION

Figure 1:
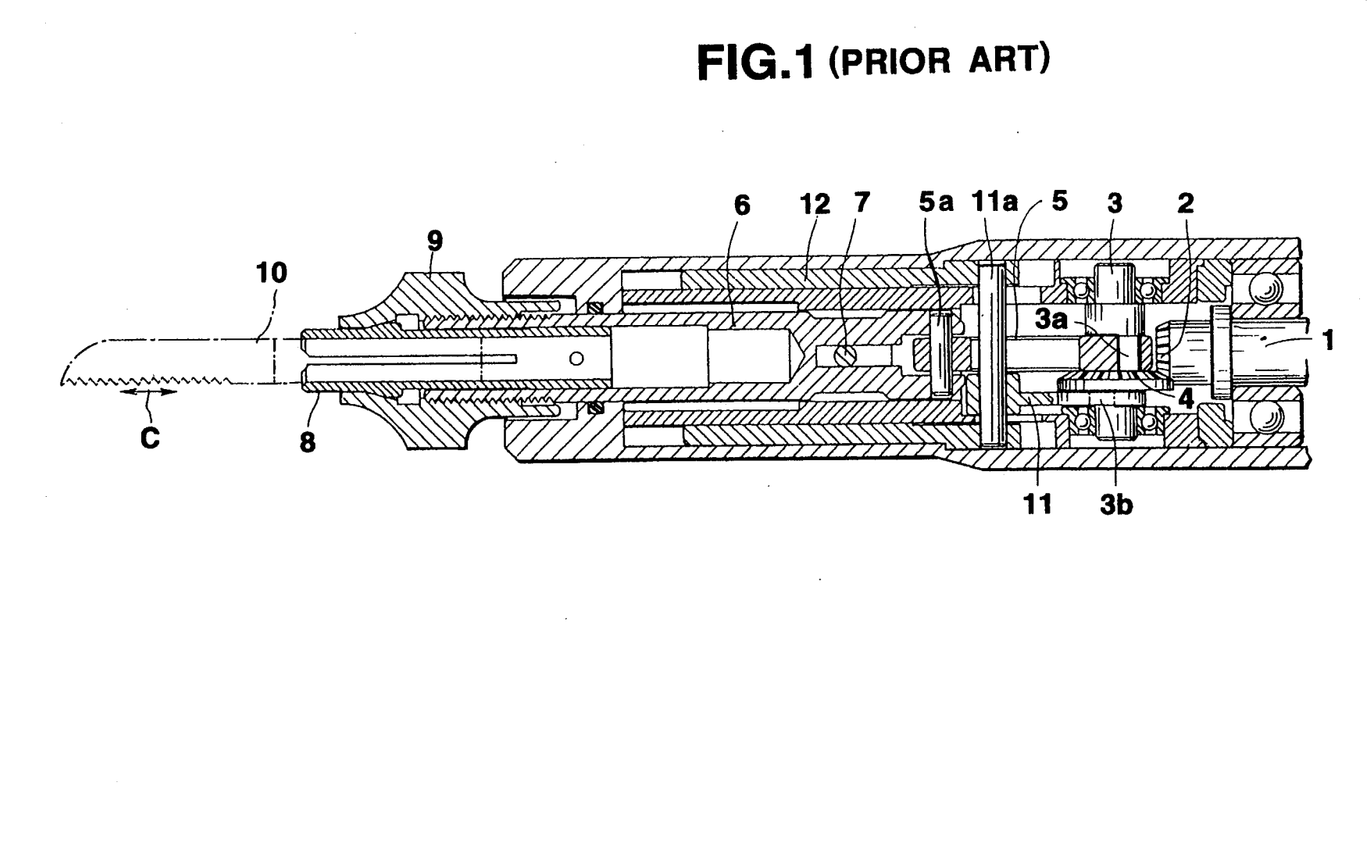
FIG. 1 is a view for explaining an example of a conventional chuck mechanism.

FIG. 1 is a constructional view for explaining a cutting device proposed by the present applicant (Japanese publication of unexamined patent application No. 3-124894). In FIG. 1, numeral 1 denotes a rotation shaft connected to a rotation shaft to be driven by, for example, a micromotor known for use in dental treatment devices, numeral 2 indicates a bevel gear mounted on the top of the rotation shaft 1, and numeral 3 designates a second rotation shaft being rotatable about an axis perpendicular to the axis of the rotation shaft 1 by means of a second bevel gear 4 that is mounted on the second rotation shaft 3 and engages with the bevel gear 2. The rotation shaft 3 is provided with two eccentric shafts 3a and 3b arranged at 180° apart from each other about the axis of the rotation shaft 3. Numeral 5 denotes a link engaged at its one end with the eccentric shaft 3a and at its opposite end with a pin 5a whereto a first-reciprocating member 6 is connected. A guide pin 7 is provided to assure smooth movement of the reciprocating member 6. A chuck 8 has an expanding slot in its axial direction. A chuck clamping member 9 threadedly engages with the first reciprocating member 6. A jig or saw 10 is inserted into the chuck clamping member 9 in loosened state and secured to the first reciprocating member 6 by tightening the chuck clamping member 9. A link 11 engages at its one end with the eccentric shaft 3b and at its opposite end with a pin 11a whereon the second reciprocating member 12 is mounted.

Accordingly, when the rotation shaft 1 rotates, its rotational movement is transmitted to the second rotation shaft 3 through the bevel gears 2 and 4, whereby the eccentric shafts 3a and 3b revolve. The eccentric motion of the eccentric shaft 3a in the direction perpendicular to the shown section of FIG. 1 is absorbed by the pin 5a and only its reciprocal movement in the lateral direction, i.e., the axial direction of the rotation shaft 1 is transmitted to the first reciprocating member 6, whereby the saw 10 reciprocates along the axis indicated by arrows C to cut a bone or the like by its cutting teeth. At the same time, revolution of the eccentric shaft 3b through the link 11 and the pin 11a is transmitted to the second reciprocating member 12 which reciprocally moves along the same axis but in the direction opposite to that of first reciprocating member 6 because the eccentric shafts 3a and 3b are located 180° apart about the axis of the rotation shaft 3. Namely, while the first reciprocating member 6 moves to the left (or the right), the second reciprocating member 12 moves to the right (or the left). The second reciprocating member 12 acts as a damping member for the first reciprocating member 6. In other words, it serves as a balancer of the rotating shaft 3, which makes rotation of the shaft 3 stabilized to ensure smooth reciprocation of the saw 10.

In the above-mentioned cutting device, the chuck clamping member 9 has an increased diameter to be easily tightened or loosened when mounting or removing of the saw 10 in or from the chuck 8. However, provided that the chuck clamping member 9 has a small diameter, it is hard to handle the chuck to clamp or release when mounting or removing of the saw 10 in or from the chuck 8.

On the other hand, the use of the chuck clamping member 9 of increased diameter may cause unstable reciprocal movement of the member due to its increased mass. Furthermore, reciprocation of the chuck clamping member 9 of large diameter in the exposed state is dangerous in itself.

Figure 2:
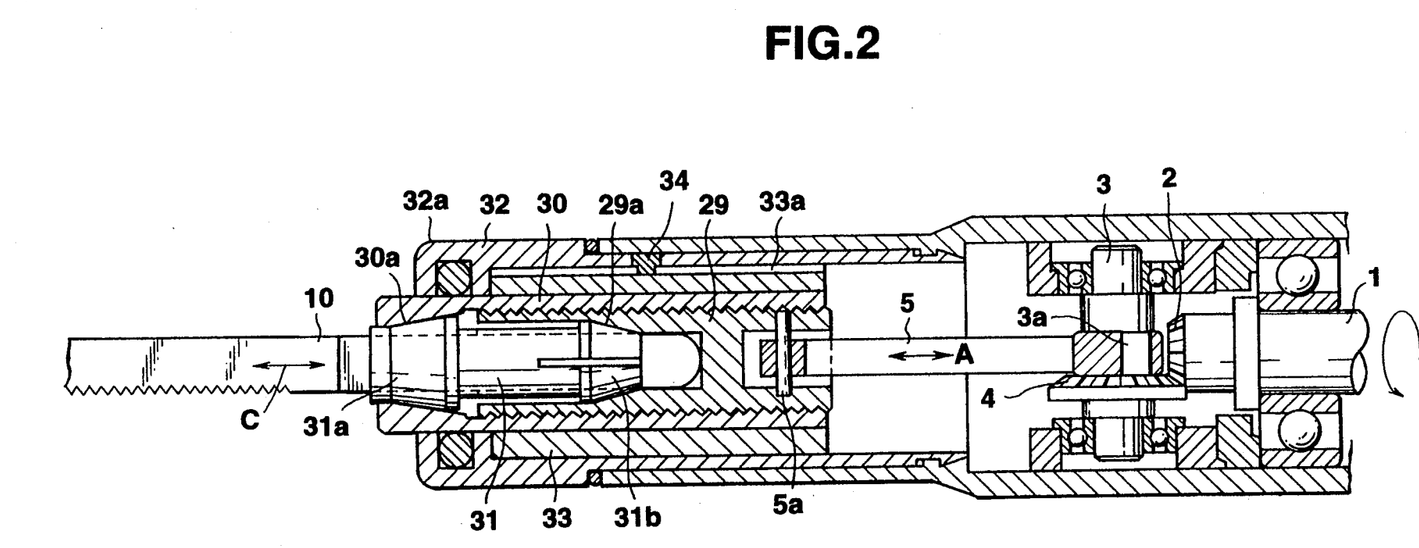
FIG. 2 is a sectional view showing a cutting device using a chuck mechanism of the present invention.

FIG. 2 is a sectional construction view of an essential portion of a cutting device used a chuck mechanism of the present invention. In FIG. 2, numeral 1 denotes a rotation shaft connected to a rotation shaft to be driven by, for example, a micromotor known for use in dental treatment devices, numeral 2 indicates a bevel gear mounted on the top of the rotation shaft 1, and numeral 3 designates a second rotation shaft being rotatable about an axis perpendicular to the axis of the rotation shaft 1 by means of a second bevel gear 4 that is mounted on the second rotation shaft and engages with the bevel gear 2. The rotation shaft 3 is provided with an eccentric shaft 3a. A connecting link 5 engages at its one end with the eccentric shaft 3a and at its opposite end with a pin 5a whereto a reciprocating member 29 is connected.

Accordingly, when the rotation shaft 1 rotates, its rotational movement is transmitted to the second rotation shaft 3 through the bevel gears 2 and 4, whereby the eccentric shaft 3a revolves. The eccentric motion of the eccentric shaft 3a in the direction perpendicular to the shown section of FIG. 2 is absorbed by the pin 5a and only its reciprocal movement in the lateral direction, i.e., the axial direction A of the rotation shaft 1 is transmitted to the reciprocating member 29, whereby the saw 10 reciprocates along the axis indicated by arrows C to cut a bone or the like by its cutting teeth.

Figure 3:
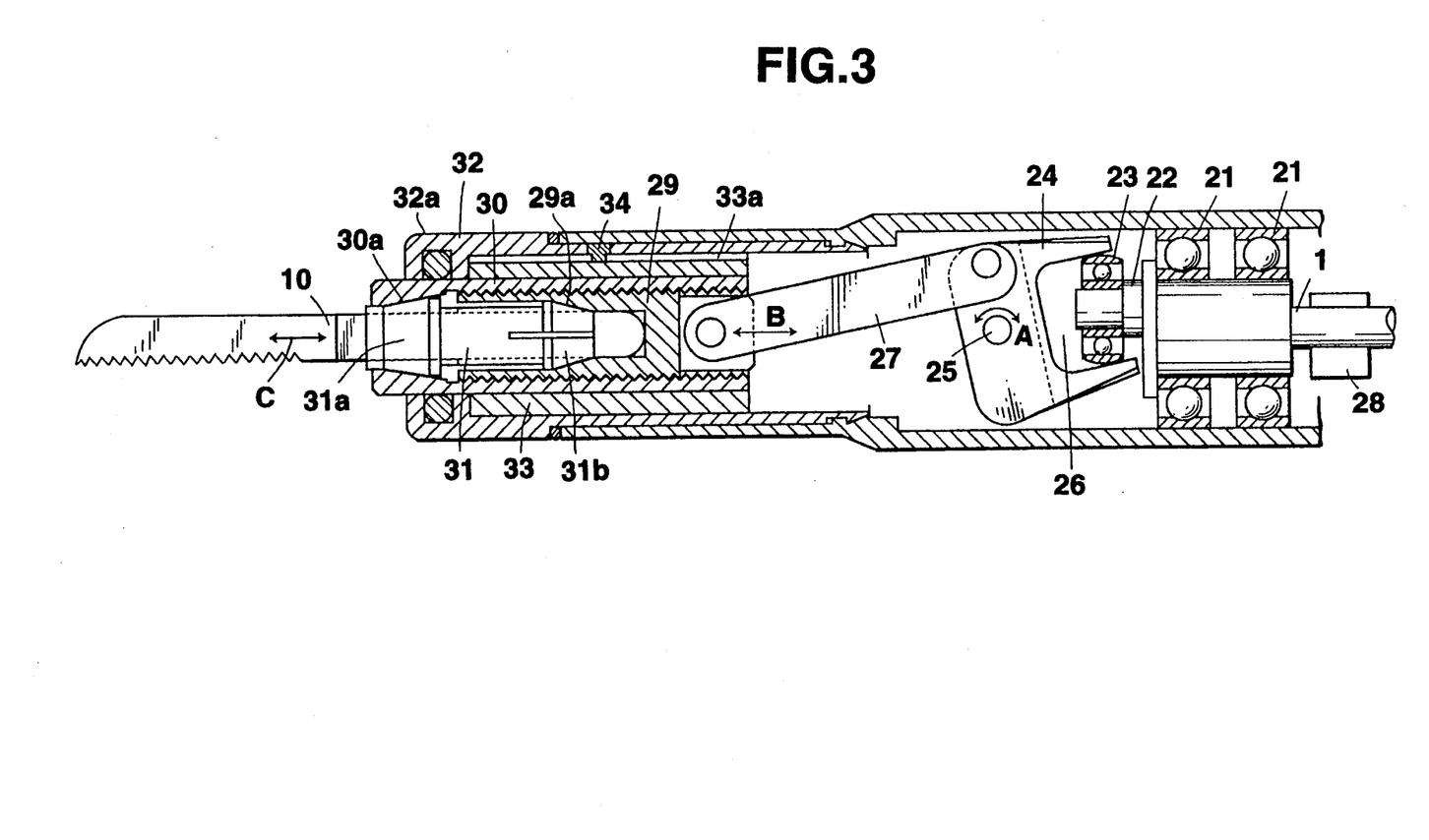
FIG. 3 is a sectional view showing another cutting device using a chuck mechanism of the present invention.

FIG. 3 is another sectional construction view of an essential portion of a cutting device using a chuck mechanism of the present invention. In FIG. 3, numeral 1 indicates a rotation shaft with bearings 21 and connected with an eccentric revolution shaft 22 which has a bearing 23 loosely fitted in a recess 26 of a rocking member 24 being rockable about an axis 25 in the direction indicated by arrows A.

Accordingly, when the rotation shaft 1 rotates, the eccentric rotation shaft 22 rotates and causes the rocking member 24 to swing in the directions indicated by arrows A about the axis 25 since the bearing 23 fitted in the recess 26 of the rocking member may freely move in the direction perpendicular to the shown section of FIG. 3 but its vertical movement is limited by the recess of the rocking member 24.

Rocking motion of the rocking member 24 in the direction A is transmitted through a connecting member 27 to a slide shaft 29 which reciprocates in the axial directions indicated by arrows B, and reciprocates the saw 10 along the axis indicated by arrows C.

As described above, the shaft 22 revolves eccentrically in relation to the shaft 1 and its eccentric circular motion is converted by the rocking member 24 into reciprocal motion along the straight line. Consequently, the shaft 1 is subjected to eccentric load that may prevent smooth rotation of the shaft 1. A balance weight 28 for compensating the eccentric load is provided to assure smooth rotation of the shaft 1.

It will be easily understood from the following description that the mechanism for converting rotational movement into linear reciprocal movement is not limited to the shown one and any other converting mechanism can be also used.

As mentioned above, in the embodiment shown in FIG. 2, the reciprocal movement of the connecting member 5 is transmitted to the slide shaft 29, and in the embodiment shown in FIG. 3, the reciprocal movement of the connecting member 27 is transmitted to the slide shaft 29, whereby the shaft 29 reciprocates in the axial direction indicated by arrows C.

In FIGS. 2 and 3, the slide shaft 29 is threaded at its periphery for engaging with internal threads of a slide shaft locking member (chuck clamping member) 30. A collet chuck 31 is disposed between the slide shaft 29 and the slide shaft locking member 30. A saw 10 can be removably secured in the collet chuck 31.

Accordingly, when the slide shaft locking member 30 (chuck clamping member) rotates to loosen the threaded engagement with the slide shaft 29, the slide shaft locking member 30 moves in the direction shown by arrows C, whereby the engagement between a clamping portion 31a of the collet chuck 31 and a chuck clamping head 30a of the slide shaft locking member 30 and the engagement between a clamping portion 31b of the collet chuck 31 and a chuck clamping portion 29a of the slide shaft 29 are released, allowing insertion or removal of the saw 10 in or from the collet chuck 31.

An axis of the saw 10 is inserted in the opened collet chuck 31 and secured therein by the clamping portions 31a and 31b in the known manner when tightening the chuck clamping member 30 against the slide shaft 29.

The embodiments shown in FIGS. 2 and 3 utilize the collet chuck 31 with the clamping portions 31a and 31b formed, respectively, at both ends to reliably hold the saw 10 at two positions. However, it shall be understood that the present invention is not limited to the shown embodiment and allows the use of a collet chuck having the clamping portion 31a only.

The numeral 32 designates a body case (rotating member) for rotating the chuck clamping member (slide shaft locking member) 30 and has the tip peripheral portion 32a having an anti-slippingly finished surface, e.g., by knurling. The knurled portion 32a can be easily grasped when turning the body case 32. An intermediate member 33 can transmit the rotational movement of the body case 32 to the chuck clamping member 30.

The intermediate member 33 has a slot 33a formed on its external surface in the axial direction, wherein an anti-rotation member 34 from the outside of the body case is fitted for transmitting the rotational movement of the body case 32 to the intermediate member 33 which in turn rotates the chuck clamping member 30.

Movement of the intermediate member 33 in the axial direction can be prevented by securing said member 33 to the case body 32 by desired means. Any desired provision is made to prevent relative rotational movement of the intermediate member 33 and the slide shaft locking member (chuck clamping member) 30 and to allow relative axial movement of them. In the shown embodiment, this is achieved by using the chuck clamping member 30 having a hexagonal external profile and the intermediate member 33 having a hexagonal internal profile. However, their profiles shall not be limited to hexagonal form only.

Figures 4A, 4B:
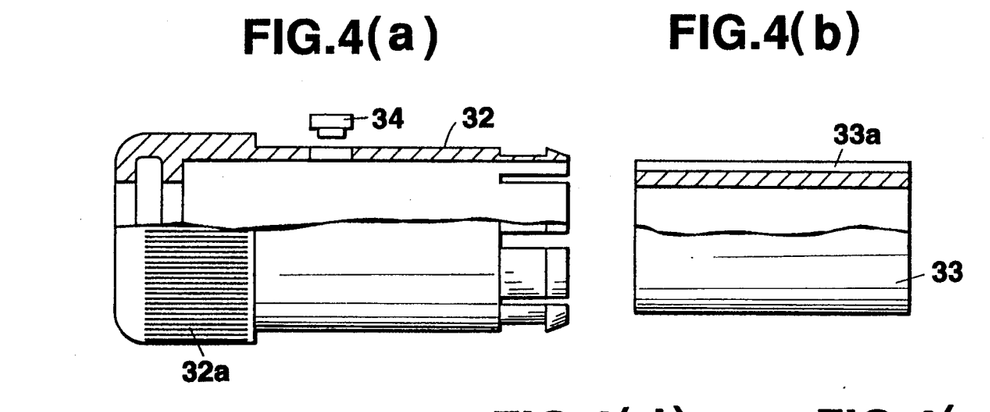
FIGS. 4(a)–4(e) are an exploded views of components of the chuck mechanism shown in FIGS. 2 and 3.
Figure 4C:
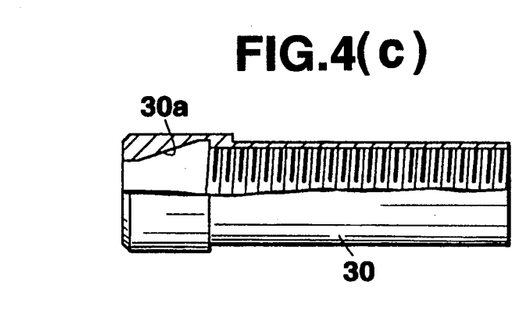
Figure 4D:
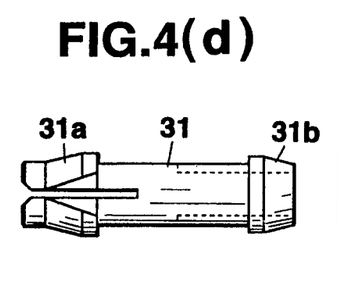
Figure 4E:
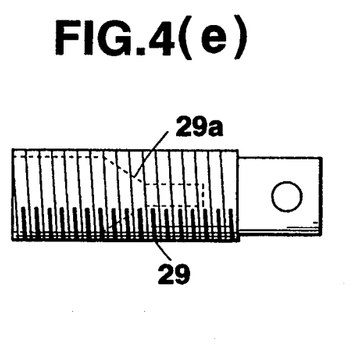

FIGS. 4(a)–4(e) are exploded views of components of the chuck mechanism shown in FIGS. 2 and 3. FIG. 4(a) indicates a body case 32 and an anti-rotation member 34, FIG. 4(b) shows an intermediate member 33, FIG. 4(c) indicates a slide shaft locking member (chuck clamping member) 30, FIG. 4(d) shows a collet chuck 31 and FIG. 4(e) shows a slide shaft 29.

Figure 5A:
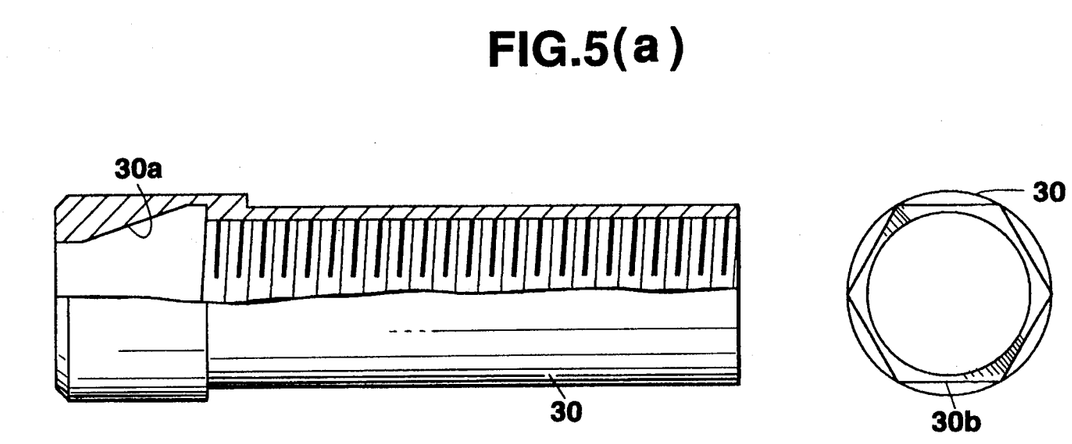
FIGS. 5(a) and 5(b) are detailed views of a chuck clamping member and an intermediate member shown in FIGS. 4(c) and 4(b).
Figure 5B:
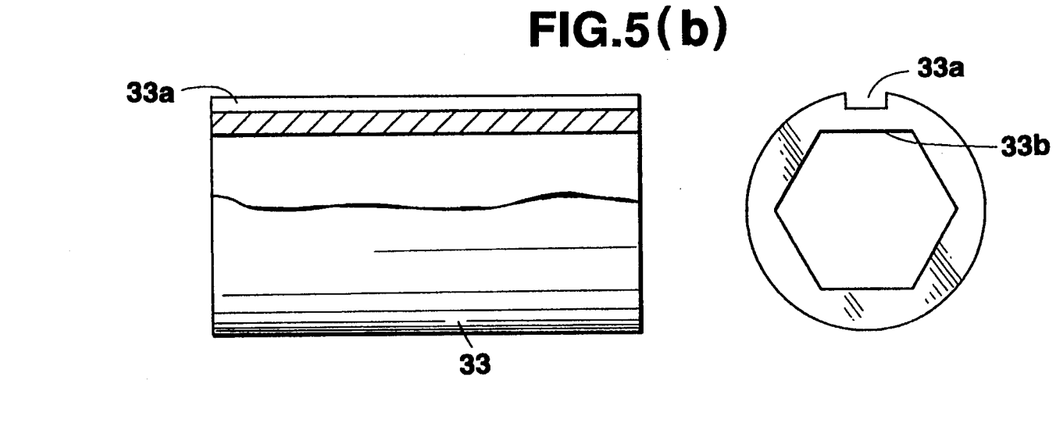

FIGS. 5(a) and 5(b) are detailed views of a slide shaft locking member (chuck clamping member) 30 (FIG. 5(a)) and an intermediate member 33 (FIG. 5(b)). As previously noted, the chuck clamping member 30 formed of hexagonal external profile 30b is fitted in the intermediate member 33 formed of hexagonal internal profile 33b to allow them to relatively move in the axial direction but not to allow their movement in the circumferential direction. However, it is easily understood that this connecting method shall not be limited to use of hexagonal profile. It is possible to form the members to be of any profile (e.g., square, octagon, etc.) excepting a circular form permitting relative rotation of them. Key-and-keyway fitting is also applicable.

As is apparent from the foregoing description, the chuck mechanism according to the present invention can offer the following advantages:

The chuck clamping member having a grasping portion of a large diameter is easy to handle when clamping or releasing a collet chuck and the reciprocating portion has a reduced mass to ensure a smooth movement. Furthermore, the chuck mechanism is safe to use since its moving portion has a least partial exposure and has a small diameter not to hit a part of human body or animal's body or other object during the medical treatment by use of a cutting tool clamped in the chuck mechanism.

As be apparent from the foregoing description, according to the present invention, it is possible to provide a cutting tool which moves reciprocally in the direction indicated by arrows C, and the rotation shaft 1 is coupled with a conventional handpiece for use in dental treatment. However, there is the fear that the reciprocating portion may be disconnected from the rotation shaft portion during operation of the device.

Figure 6:
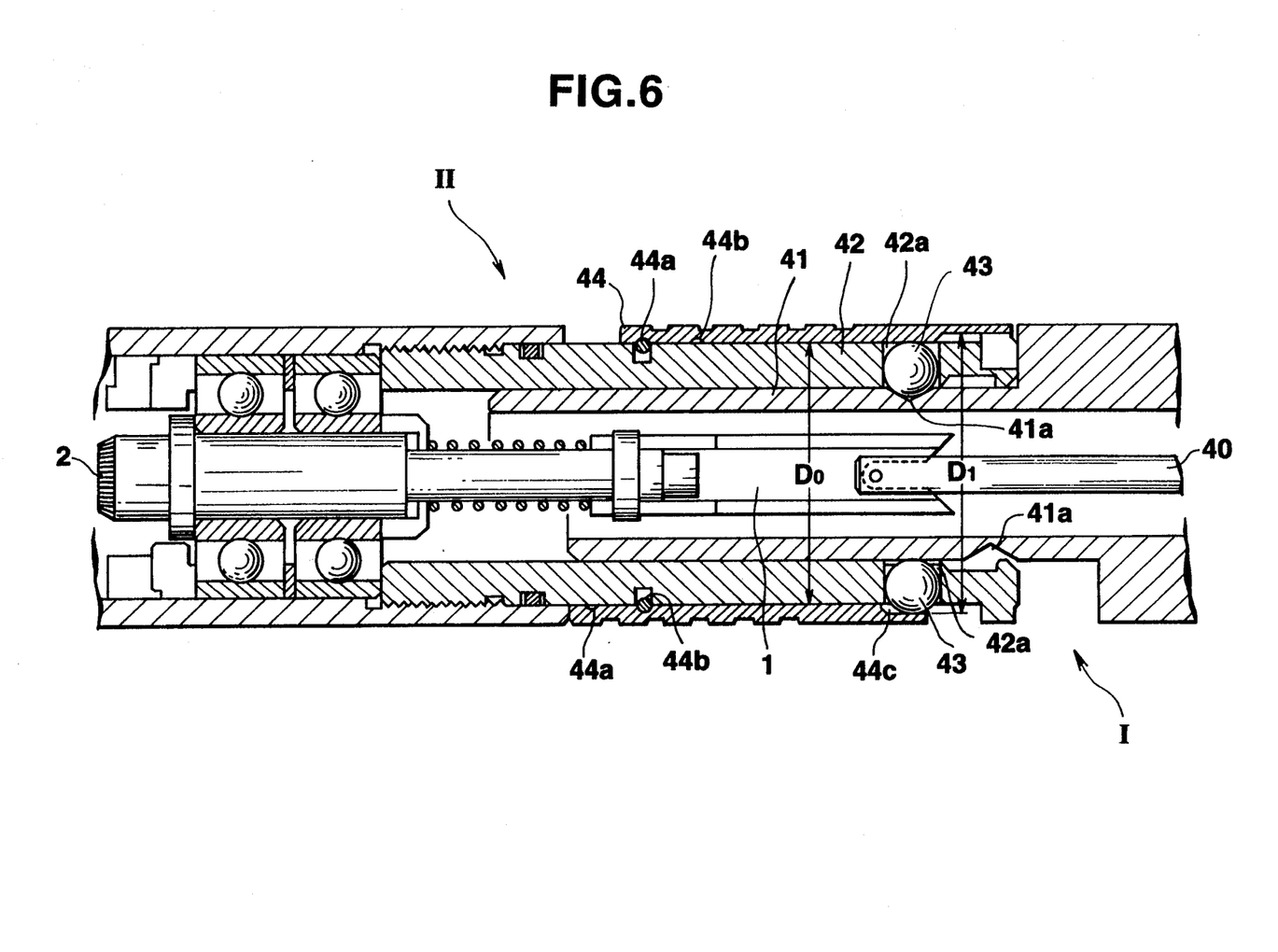
FIG. 6 shows a sectional view for explaining connecting portion of a cutting device.

FIG. 6 is a sectional view for explaining a connecting portion of the device, by which the rotating portion and the reciprocating portion are steadily coupled with each other so that the latter may not slip out from the former. In FIG. 6, a rotation shaft side and reciprocating portion side are indicated by numerals I and II, respectively. A rotation shaft 40 in a dental handpiece is driven by a micromotor (not shown) mounted in a power section and located in a center of a sleeve 41 having a peripheral groove 41a formed externally thereon. A mechanism for connecting the rotational shaft side I to the reciprocating portion side II comprises a connecting sleeve 42 that accommodates therein the rotation shaft 1 connected at its one end to the rotation shaft 40 and has a plurality of through holes 42a arranged in circumferential direction thereof. The sleeve 41 is slidably inserted in the axial direction in the connecting sleeve 42. Balls 43 are placed in each through-hole 42a of the connecting sleeve 42. The connecting sleeve 42 is accommodated in a sliding sleeve 44 which is slidable in its axial direction along the external surface of the connecting sleeve 42 and can be located at any of two positions 44a and 44b. This sliding sleeve 44 has an internally concaved portion 44c having an inner diameter D1 larger than an outer diameter DO of the connecting sleeve 42. To provide a tight connection, the sliding sleeve 44 is positioned at the first fixing position 44b (see the lower half of FIG. 6) with a concaved portion placed opposite to the balls 43 (see the lower half of FIG. 6), and the sleeve 41 is then inserted into the connecting sleeve 42 in such a way that the balls 43 are fitted in the circular groove 41a of the sleeve 41(see the upper half of FIG. 6). Then, the sliding sleeve 44 is located at the second fixing position 44a in such way that the ball 43 is placed in the circular groove 41a under the pressure of the inner wall surface of the sliding sleeve 44 (see the upper half of FIG. 6). This eliminates the possibility of disconnection of the connecting sleeve 42 from the sleeve 41.

As mentioned above, the rotation shaft portion I and reciprocating portion II are securely connected with each other by means of the balls 43 and the sliding sleeve 44 so as not to cause the reciprocating portion II to slip off from the rotor shaft portion I during operation of the device for converting the rotational movement of the rotation shaft 40 into reciprocal movement along the axis of the rotor shaft 40.

We claim:

1. A cutting tool comprising a sawing plate and a chucking mechanism, said mechanism including an externally threaded slide shaft whereto reciprocal movement is transmitted, a collet chuck, a slide shaft locking member accommodating the collet chuck therein and having a head for clamping the collet chuck at one end of the locking member and an internally threaded portion at an opposite end of the locking member for threadedly engaging with the slide shaft, an intermediate member, means for securing said intermediate member to the slide shaft locking member so as to be movable in an axial direction but not to be rotatable in a circumferential direction thereof, a body case, means for securing said body case to the intermediate member so as to be movable in an axial direction but not to be rotatable in a circumferential direction thereof, wherein clamping and releasing of collet chuck is achieved by adjusting the threaded engagement between the slide shaft and the slide shaft locking member by rotating the body case against the intermediate member, and the sawing plate is chucked by the chucking mechanism.

2. A chuck mechanism for chucking a cutting tool to a reciprocally movable member, comprising a chucking mechanism for removably securing the reciprocally movable member, said chucking mechanism including an externally threaded slide shaft whereto reciprocal movement is transmitted, a collet chuck, a slide shaft locking member accommodating the collet chuck therein and having a head for clamping the collet chuck at one end of the locking member and an internally threaded portion at an opposite end of the locking member for threadedly engaging with the slide shaft, an intermediate member, means for securing said intermediate member to the slide shaft locking member so as to be movable in an axial direction but not to be rotatable in a circumferential direction thereof, a body case, means for securing said body case to the intermediate member so as to be movable in an axial direction but not to be rotatable in a circumferential direction thereof, wherein clamping and releasing of the collet chuck is achieved by adjusting the threaded engagement between the slide shaft and the slide shaft locking member by rotating the body case against the intermediate member.

3. A chuck mechanism for chucking a jig to a reciprocally movable member, comprising a chucking mechanism for removably securing the reciprocally movable member, said chocking mechanism including an externally threaded slide shaft whereto reciprocal movement is transmitted, a collet chuck, a slide shaft locking member accommodating the collet chuck therein and having a head for clamping the collet chuck at one end of the locking member and an internally threaded portion at an opposite end of the locking member for threadedly engaging with the slide shaft, an intermediate member, means for securing said intermediate member to the slide shaft locking member so as to be movable in an axial direction but not to be rotatable in a circumferential direction thereof, a body case, means for securing said body case to the intermediate member so as to be movable in an axial direction but not to be rotatable in a circumferential direction thereof wherein clamping and releasing of the collet chuck is achieved by adjusting the threaded engagement between the slide shaft and the slide shaft locking member by rotating the body case against the intermediate member.

4. A chuck mechanism according to claim 3, wherein said body case includes a collet chuck clamping head having a periphery that is knurled.

5. A chuck mechanism according to claim 3, wherein the slide shaft locking member has a hexagonal external profile and the intermediate member has a hexagonal internal profile and they are coupled with each other to be relatively movable in the axial direction but not to be relatively rotatable in the circumferential direction.

* * * * *